US011429381B1

(12) United States Patent
Goswami et al.

(10) Patent No.: US 11,429,381 B1
(45) Date of Patent: Aug. 30, 2022

(54) SOFTWARE APPLICATION REFACTORING AND MODIFICATION

(71) Applicant: INTERNATIONAL BUSINESS MACHINES CORPORATION, Armonk, NY (US)

(72) Inventors: Nisha Goswami, New Delhi (IN); Ashok Pon Kumar Sree Prakash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/447,335

(22) Filed: Sep. 10, 2021

(51) Int. Cl.
*G06F 8/72* (2018.01)

(52) U.S. Cl.
CPC ..................... *G06F 8/72* (2013.01)

(58) Field of Classification Search
CPC ........................................... G06F 8/72
See application file for complete search history.

(56) References Cited

U.S. PATENT DOCUMENTS

| | | | |
|---|---|---|---|
| 10,628,152 B2 | 4/2020 | Chandramouli | |
| 10,637,952 B1 | 4/2020 | Koenig | |
| 11,042,369 B1* | 6/2021 | Kimball | G06F 11/3466 |
| 2004/0044994 A1* | 3/2004 | Bera | G06F 8/72 |
| | | | 717/136 |
| 2008/0126070 A1* | 5/2008 | Copty | G06F 8/72 |
| | | | 703/22 |
| 2010/0153914 A1* | 6/2010 | Arsanjani | G06F 8/72 |
| | | | 717/110 |
| 2010/0313179 A1* | 12/2010 | Groves | G06F 8/34 |
| | | | 717/104 |
| 2013/0125086 A1* | 5/2013 | Abadi | G06F 8/72 |
| | | | 717/104 |

(Continued)

OTHER PUBLICATIONS

Paltoglou et al., "Automated refactoring of legacy JavaScript code to ES6 modules" (Year: 2021).*

(Continued)

*Primary Examiner* — Phillip H Nguyen
(74) *Attorney, Agent, or Firm* — Schmeiser, Olsen & Watts; Christopher M. Pignato

(57) ABSTRACT

A system, method, and computer program product for implementing software modernization and refactoring is provided. The method includes analyzing source code. In response, components and associated interconnections of the source code are identified and a runtime associated with a software application is analyzed. Likewise, components and associated interconnections of the runtime are identified and architectural data is analyzed with respect to the source code and runtime. In response, a software and hardware model associated with operation of the server and software application is generated and the software and hardware model is correlated with results of analyzing the architectural data, source code, and runtime. A dashboard graphical user interface and refactoring model code associated with a modernization and refactoring process configured to generate refactored code are generated and the refactoring model code is executed. In response, refactored code of the software application is generated thereby operationally modifying the software application.

20 Claims, 7 Drawing Sheets

(56) References Cited

U.S. PATENT DOCUMENTS

| | | | |
|---|---|---|---|
| 2014/0165035 A1* | 6/2014 | Campbell | G06F 8/72 |
| | | | 717/121 |
| 2015/0363192 A1* | 12/2015 | Sturtevant | G06F 8/71 |
| | | | 717/131 |
| 2016/0062753 A1 | 3/2016 | Champagne | |
| 2018/0357055 A1 | 12/2018 | Apte | |
| 2019/0121635 A1* | 4/2019 | Alshayeb | G06F 21/566 |
| 2020/0314169 A1 | 10/2020 | Camargo | |

OTHER PUBLICATIONS

Kebir et al., "A genetic algorithm-based approach for automated refactoring of component-based software" (Year: 2017).*

Daniel et al., "A genetic algorithm-based approach for automated refactoring of component-based software" (Year: 2011).*

Nagarajan et al., "Refactoring Using Event-based Profiling" (Year: 1-3) (Year: 2007).*

Garrido' et al., "Model Refactoring in Web Applications" (Year: 2007).*

Gulati, Vikram et al.; Introducing IBM Mono2Micro; https://www.ibm.com/cloud/blog/announcements/ibm-mono2micro; May 6, 2020; 7 pages.

Mell, Peter et al.; "The NIST Definition of Cloud Computing;" National Institute of Standards and Technology; Special Publication 800-145; Sep. 2011; 7 pages.

Anonymous; Method and System for Generating a Deployment Architecture Exploiting Input from Different Media Formats; IP.com; IPCOM000255405D; Sep. 25, 2018; 4 pages.

Pri, Ruchir et al.; Accelerate innovation with AI for app modernization; https://www.ibm.com/blogs/journey-to-ai/2020/05/accelerate-innovation-with-ai-for-app-modernization/; May 5, 2020; 6 pages.

* cited by examiner

SOFTWARE APPLICATION REFACTORING AND MODIFICATION

BACKGROUND

The present invention relates generally to a method for refactoring a software application and in particular to a method and associated system for improving software technology associated with generating refactored code. Typical software improvement processes include an inaccurate process with little flexibility. Modifying software operations may include a complicated process that may be time consuming and require a large amount of resources. Accordingly, there exists a need in the art to overcome at least some of the deficiencies and limitations described herein above.

SUMMARY

A first aspect of the invention provides a server comprising a processor coupled to a computer-readable memory unit, the memory unit comprising instructions that when executed by the processor implements a software modernization and refactoring method comprising: analyzing, by the processor, source code of a software application; first identifying, by the processor based on results of the analyzing the source code, first components and first associated interconnections of the source code; analyzing, by the processor, a runtime associated with the software application; second identifying, by the processor based on results of the analyzing the runtime, second components and second associated interconnections of the runtime; analyzing, by the processor, architectural data with respect to the source code and the runtime, wherein the architectural data comprises data defining components of the software application; generating, by the processor based on results of the analyzing the architectural data, a software and hardware model associated with operation of the server and the software application; correlating, by the processor, the software and hardware model with the results of the analyzing the source code and the results of the analyzing the runtime; generating, by the processor in response to results of the correlating, refactoring model code associated with a refactoring process configured to generate refactored code; generating, by the processor in response to the generating the refactoring model code, a dashboard graphical user interface (GUI) associated with executing multiple possibilities for modifying the software application within a same format and abstraction level as the architectural data; executing, by the processor in response to input entered via the dashboard GUI, the refactoring model code; and generating, by the processor in response to results of the executing, refactored code of the software application thereby operationally modifying the software application.

A second aspect of the invention provides a software modernization and refactoring method comprising: analyzing, by a processor of a server, source code of a software application; first identifying, by the processor based on results of the analyzing the source code, first components and first associated interconnections of the source code; analyzing, by the processor, a runtime associated with the software application; second identifying, by the processor based on results of the analyzing the runtime, second components and second associated interconnections of the runtime; analyzing, by the processor, architectural data with respect to the source code and the runtime, wherein the architectural data comprises data defining components of the software application; generating, by the processor based on results of the analyzing the architectural data, a software and hardware model associated with operation of the server and the software application; correlating, by the processor, the software and hardware model with the results of the analyzing the source code and the results of the analyzing the runtime; generating, by the processor in response to results of the correlating, refactoring model code associated with a refactoring process configured to generate refactored code; generating, by the processor in response to the generating the refactoring model code, a dashboard graphical user interface (GUI) associated with executing multiple possibilities for modifying the software application within a same format and abstraction level as the architectural data; executing, by the processor in response to input entered via the dashboard GUI, the refactoring model code; and generating, by the processor in response to results of the executing, refactored code of the software application thereby operationally modifying the software application.

A third aspect of the invention provides a computer program product, comprising a computer readable hardware storage device storing a computer readable program code, the computer readable program code comprising an algorithm that when executed by a processor of a server implements a software modernization and refactoring method, the method comprising: analyzing, by the processor, source code of a software application; first identifying, by the processor based on results of the analyzing the source code, first components and first associated interconnections of the source code; analyzing, by the processor, a runtime associated with the software application; second identifying, by the processor based on results of the analyzing the runtime, second components and second associated interconnections of the runtime; analyzing, by the processor, architectural data with respect to the source code and the runtime, wherein the architectural data comprises data defining components of the software application; generating, by the processor based on results of the analyzing the architectural data, a software and hardware model associated with operation of the server and the software application; correlating, by the processor, the software and hardware model with the results of the analyzing the source code and the results of the analyzing the runtime; generating, by the processor in response to results of the correlating, refactoring model code associated with a refactoring process configured to generate refactored code; generating, by the processor in response to the generating the refactoring model code, a dashboard graphical user interface (GUI) associated with executing multiple possibilities for modifying the software application within a same format and abstraction level as the architectural data; executing, by the processor in response to input entered via the dashboard GUI, the refactoring model code; and generating, by the processor in response to results of the executing, refactored code of the software application thereby operationally modifying the software application.

The present invention advantageously provides a simple method and associated system capable of automating a process for refactoring a software application.

DETAILED DESCRIPTION

Figure 1:
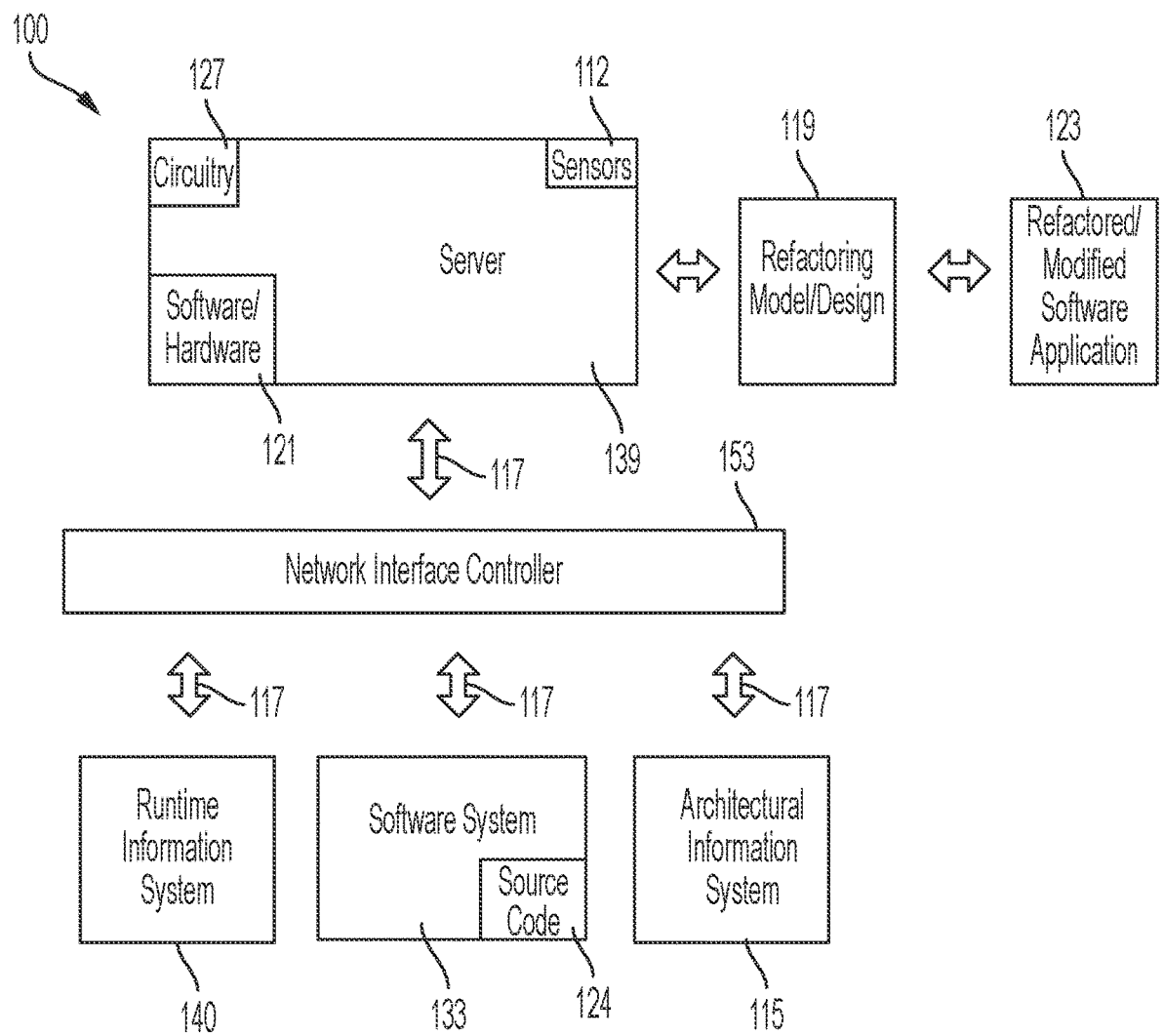
FIG. 1 illustrates a system for improving software technology associated with analyzing source code and a runtime associated with a software application and generating refactored code of the software application thereby operationally modifying the software application, in accordance with embodiments of the present invention.

FIG. 1 illustrates a system 100 for improving software technology associated with analyzing source code and a runtime associated with a software application 133 and generating refactored code of the software application 133 thereby operationally modifying the software application 133, in accordance with embodiments of the present invention. Typical software modernization processes require a great deal of information to plan and execute an associated process. Manual software modernization techniques rely on architecture, planning, expert opinion, and execution planning. Likewise, typical automated software modernization techniques rely on processes for extracting information from sources such as source code and runtime to build a dependency graph. While manual modernization techniques lack the association for actual implementation, typical automated techniques lack abstractions to generate user friendly suggestions. Many existing modernization systems execute at a class level or a deployment level and do not leverage information associated with architecture diagrams associated with human level relations and a difficulty incurred with respect to unlocking information from associated source code and runtime. Therefore, system 100 enables a process for enabling an automated entity within a design loop for executing a refactoring design of software with respect to a human implemented mode. The process includes: 1. Leveraging digital and analog information within hardware and software architecture diagrams 2. Combining the digital and analog information with runtime and source code retrieved information 3. Allowing a user to interact with automated generated refactored hardware and software architectures.

System 100 enables an automated human-in-the-loop refactoring, design, and modernization process associated with generating a software application with respect to a simple understandable mode by leveraging information within architecture diagrams, combining runtime/source code information, and allowing a user to interact with automated generated refactored architectures. A refactoring process is defined herein as a process for restructuring existing computer code (i.e., changing the factoring) without changing its external behavior. A refactoring process may be enabled for improving a software design, structure, and/or implementation while preserving its functionality.

System 100 of FIG. 1 includes a server 139, a runtime information system 140, a software system 133 comprising source code 124, an architectural information system 115, and a network interface controller interconnected through a network 7. System 100 is configured to generate a refactoring model/design 119 and subsequently a refactored modified software application 123. Server 139 comprises sensors 112, circuitry 127, and software/hardware 121. Server 139, runtime information system 140, software system 133, and architectural information system 115 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 139, runtime information system 140, software system 133, and architectural information system 115 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving software technology associated with analyzing source code and a runtime associated with a software application and generating refactored code of the software application thereby operationally modifying the software application. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 is enabled to automate a process for refactoring a software application as follows:

1. Analyzing source code and identifying associated components and interconnections of a software application.
2. Analyzing runtime and identifying associated components and interconnections of the software application.
3. Analyzing (hardware and software) architectural diagrams and generating a hardware/software model of an existing hardware/software system.
4. Correlating the model with information from the runtime and source code analysis.
5. Generating a refactored model based on a refactoring strategy such as replatforming, rearchitecting, or redesigning.
6. Generating an interactive What-if analysis (i.e., sensitivity analysis) graphical user interface (GUI) dashboard comprising various possibilities within a same format/abstraction level as original architecture diagrams. A user/architect is enabled to interact with the GUI dashboard and create a final software design. A what-if analysis is defined herein as a technique enabled to determine how a projected performance is affected by changes within assumptions that projections are based upon. A what-if analysis may be implemented to compare different scenarios and associated potential outcomes based on fluctuating conditions.

7. Enabling an architect to interact with the GUI dashboard for generating the final software design. If the architect locates gap in a proposed design, suggestions are incorporated he What-if dashboard is presented with a revised design. If the architect approves one of various options presented on the What-if dashboard, then the software design is finalized.

8. Refactoring software code with respect to the finalized design.

Analyzing source code and runtime and identifying associated components and interconnections may include leveraging hardware/software systems for extracting information from the source code and runtime. The hardware/software systems are configured to execute program analysis techniques to analyze the source code. Likewise, the hardware/software systems are configured to execute instrumentation/log analytics techniques to analyze runtime behavior and create a graph of the components located within various abstraction levels.

Hardware and software architectural diagrams may include information in standard formats such as, inter alia, unified modeling language, a diagramming service, etc. Likewise, (hardware and software) architectural diagrams may be analyzed via usage of automated systems. Information retrieved from architectural diagrams may be correlated for analysis. A process for refactoring software based on architectural diagrams may be executed with respect to a containerization process as follows:

1. User entry points are extracted from the architectural diagrams and associated analysis provides ingress information.

2. An associated state diagram may be analyzed to differentiate between stateful components and non-stateful components.

3. Relevant information is extracted from a related activity diagram, sequence diagram, communication diagram, component diagram, etc. to identify a split of associated microservices.

Correlating the model with information from the runtime and source code analysis may be enabled via usage of a class diagram and associated deployment diagram. A related mapping may be invoked between information with the source code, runtime, and architectural diagrams. If class diagram and associated deployment diagram are not present, then heuristic based string mapping, clustering, and classification techniques may be used to identify mapping processes.

Generating a refactored model may be enabled via execution of a specialized algorithm/code (e.g., replatform code, refactor code, rearchitect code, etc.). A refactoring process may include detecting associated configurations within source code aided by deployment design. An associated rearchitecting process may include retrieving a source code call graph and communication diagrams for analysis.

Generating final software design may include enabling an to interact with the what if GUI dashboard to execute various design choices thereby enabling the GUI dashboard to execute modification processes with respect to information retrieved from source code, runtime, and architecture diagrams. When a final software design has been completed, a new set of architectural diagrams, associated source code, and deployment design may be implemented thereby allowing an architect to interact with the what if GUI dashboard to enable various software design choices. Subsequently, source code may be refactored as per the final design and a wave plan and sprint plan may be generated based on changes and implications. The architecture changes may be implemented via hardware and software modifications.

Figure 2:
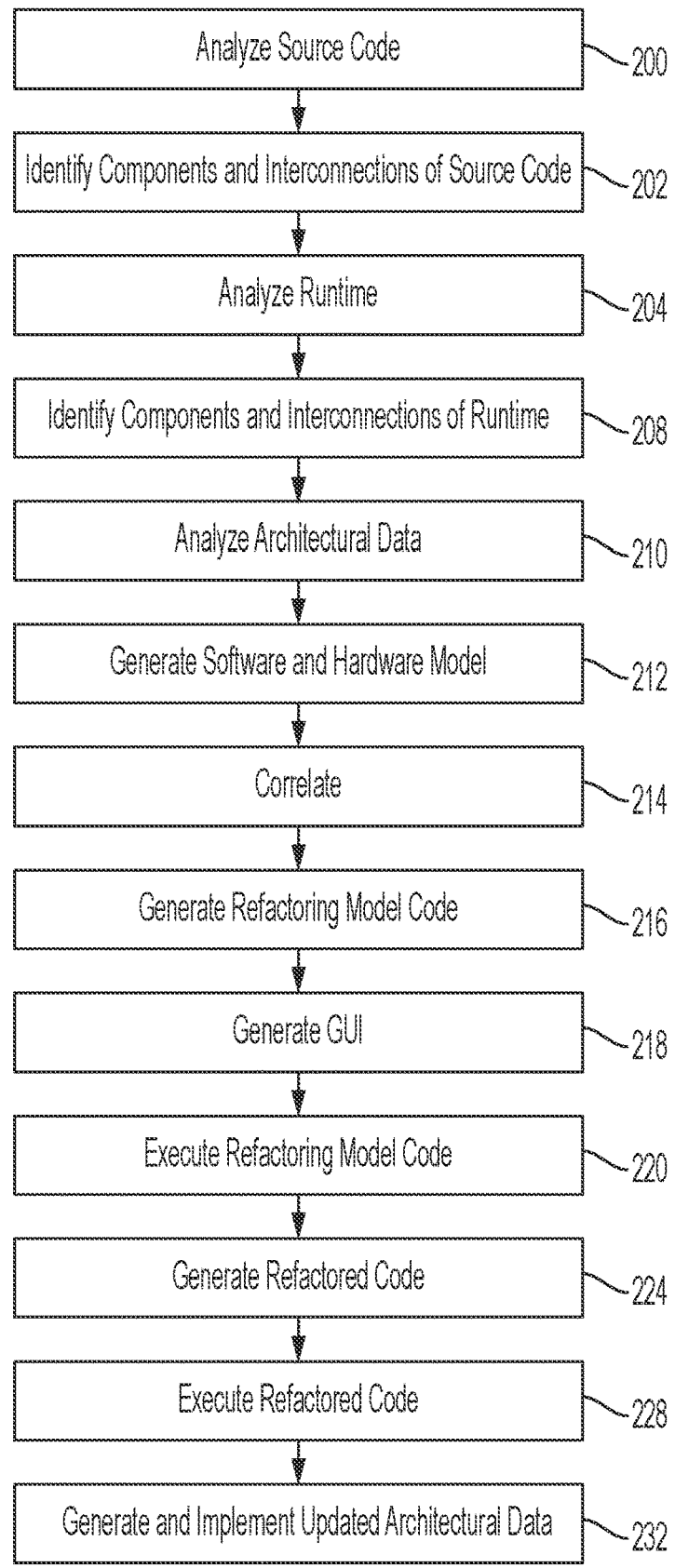
FIG. 2 illustrates an algorithm detailing a process flow enabled by the system of FIG. 1 for improving software technology associated with analyzing source code and a runtime associated with a software application and generating refactored code of the software application thereby operationally modifying the software application, in accordance with embodiments of the present invention.

FIG. 2 illustrates an algorithm detailing a process flow enabled by system 100 of FIG. 1 for improving software technology associated with analyzing source code and a runtime associated with a software application and generating refactored code of the software application thereby operationally modifying the software application, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed by server 139. In step 200, source code of a software application (of a server) is analyzed. Analyzing the source code may include executing program analysis code with respect to the source code. Likewise, analyzing the runtime may include executing instrumentation and log analytics code with respect to a runtime behavior of the runtime.

In step 202, components and associated interconnections of the source code are identified based on results of the analysis of step 200. In step 204, a runtime associated with the software application is analyzed. In step 208, components and associated interconnections of the runtime are identified based on results of the analysis of step 204. In step 210, architectural data is analyzed with respect to the source code and runtime. The architectural data comprises data defining components of the software application. The architectural data may include a multilevel visual architectural diagram presenting the components of the software application. Analyzing the architectural data may include correlating information from multiple diagrams (comprising the architectural data) with respect to the source code and runtime.

In step 212, a software and hardware model associated with operation of the server and software application is generated based on the analysis of step 210. In step 214, the software and hardware model is correlated with results of the analysis of steps 200 and 204. In step 216, refactoring model code is generated based on results of step 214. The refactoring model code is associated with a refactoring process configured to generate refactored code. The refactoring process may include, inter alia, a software replatform process, a software rearchitecting process, a software redesigning process, etc.

In step 218, a dashboard graphical user interface (GUI) is generated with respect to the refactoring model code. The dashboard GUI is associated with executing multiple possibilities for modifying the software application within a same format and abstraction level as the architectural data. In step 220, the refactoring model code is executed in response to input entered via the dashboard GUI. Additionally, interactions between an architect entity and the dashboard GUI may be enabled and in response, a final design for the software application may be generated such that executing refactoring model code is performed with respect to the final design. Likewise, results of the interactions may be configured to determine that a gap exists within a proposed design associated with generating the final design such that data associated with the gap is received from the architect via the dashboard GUI and a revised design for the software application is generated generating based on the data. Generating the final design may be performed with respect to the revised design. Results of the interactions may be used to determine that the architect has authorized at least one option associated with the final design and the final design may be finalized after the at least one option has been authorized.

In step 224, refactored code for the software application is generated thereby resulting in operational modification of the software application. In step 228, the refactored code is executed. In step 232, updated architectural data, updated source code, and an updated deployment design for the software application are generated in response to results of step 228. The updated architectural data, updated source code, and updated deployment design may be implemented with respect to the software application being operationally modified.

Figure 3:
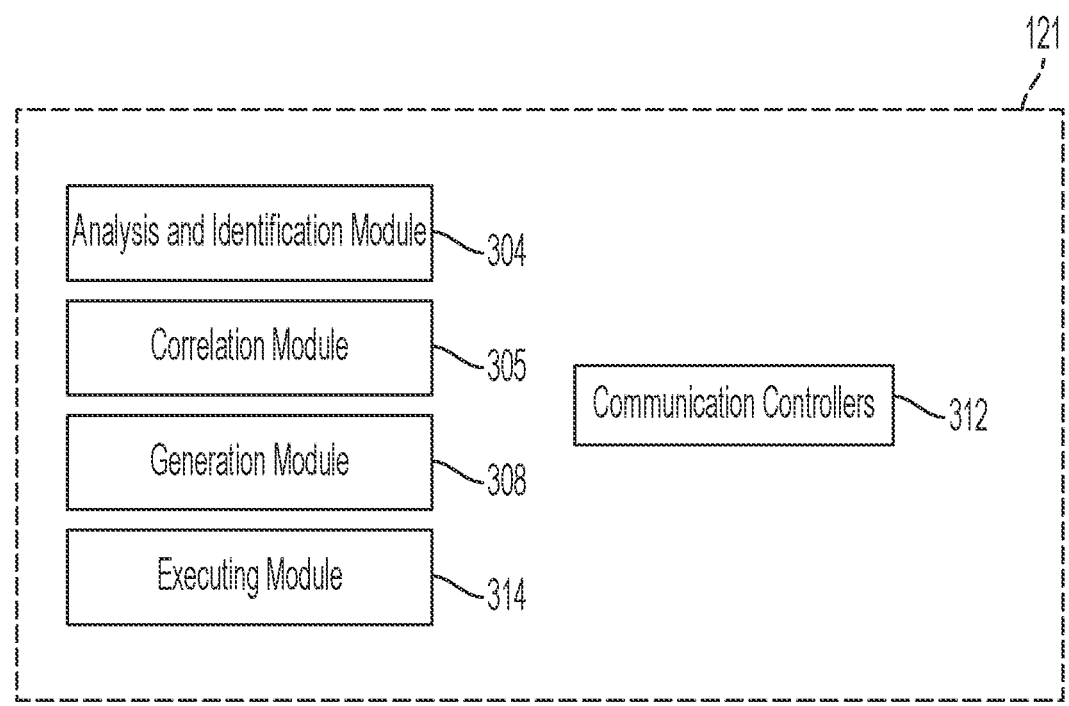
FIG. 3 illustrates an internal structural view of the software/hardware of FIG. 1, in accordance with embodiments of the present invention.

FIG. 3 illustrates an internal structural view of software/hardware 121 of FIG. 1, in accordance with embodiments of the present invention. Software/hardware 121 includes an analysis and identification module 304, a correlation module 305, a generation module 308, an executing module 314, and communication controllers 312. Analysis and identification module 304 comprises specialized hardware and software for controlling all functions related to the analysis and identification steps of FIG. 2. Correlation module 305 comprises specialized hardware and software for controlling all functionality related to the correlation steps described with respect to the algorithm of FIG. 2. Generation module 308 comprises specialized hardware and software for controlling all functions related to the model and code generating steps of FIG. 2. Executing module 314 comprises specialized hardware and software for controlling all functions related to the code execution steps of the algorithm of FIG. 2. Communication controllers 312 are enabled for controlling all communications between analysis and identification module 304, a correlation module 305, a generation module 308, an executing module 314.

Figure 4:
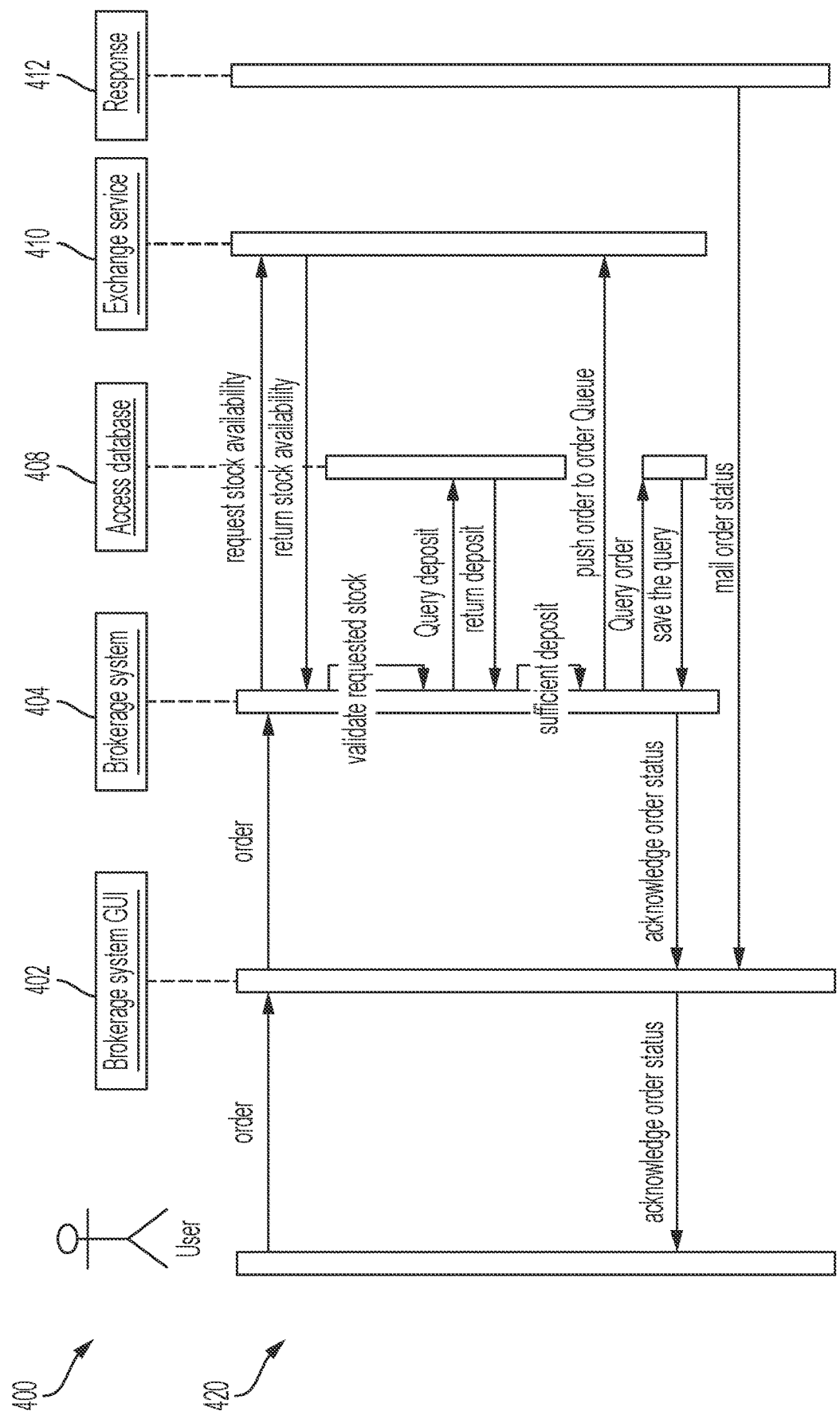
FIG. 4 illustrates architectural diagram analysis enabled via the system of FIG. 1, in accordance with embodiments of the present invention.

FIG. 4 illustrates an architectural diagram 400 analysis enabled via system 100 of FIG. 1, in accordance with embodiments of the present invention. Architectural diagram 400 comprises a sequence diagram. Alternative architectural diagrams may include, inter alia, structural diagrams, class diagrams, component diagrams, deployment diagrams, object diagrams, package diagrams, profile diagrams, composite structure diagrams, behavioral diagrams, use case diagrams, activity diagrams, state machine diagrams, sequence diagrams communication diagrams, interaction overview diagrams, timing diagrams, etc. Information from multiple architectural diagrams may be correlated. For example, components and interaction mode/frequency/types may be deciphered from architectural diagram 400. Architectural diagram 400 comprises a sequence diagram configured to execute code for enabling a brokerage system implementation for refactoring code for a software application. Architectural diagram 400 illustrates a brokerage system GUI 402, a brokerage system 404, an access database 408, an exchange service 410, and a response system 412 configured to execute a process 420 (via execution of specialized code) for querying deposit and order based databases.

Figure 5:
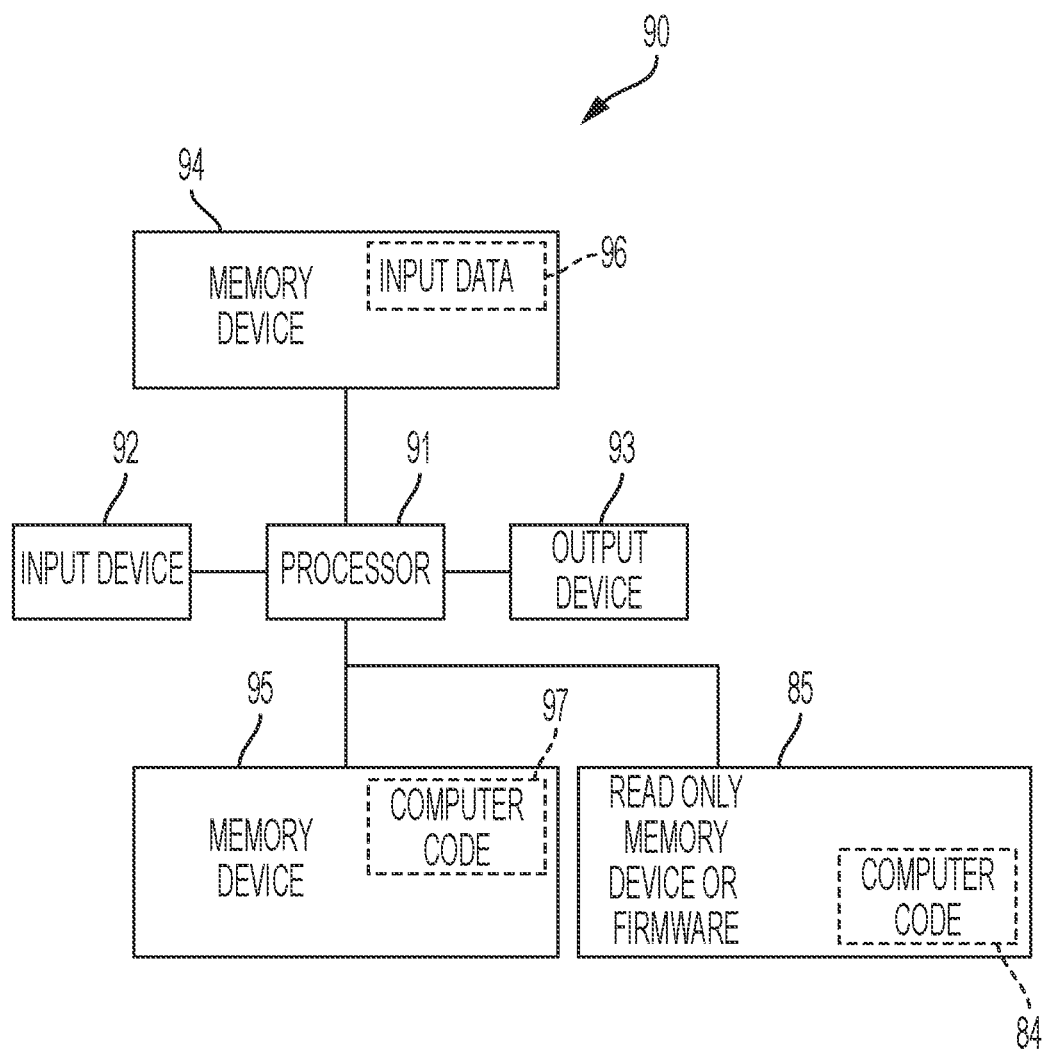
FIG. 5 illustrates a computer system used by the system of FIG. 1 for improving software technology associated with analyzing source code and a runtime associated with a software application and generating refactored code of the software application thereby operationally modifying the software application, in accordance with embodiments of the present invention.

FIG. 5 illustrates a computer system 90 (e.g., server 139 of FIG. 1) used by or comprised by the system 100 of FIG. 1 for improving software technology associated with analyzing source code and a runtime associated with a software application and generating refactored code of the software application thereby operationally modifying the software application, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software technology associated with analyzing source code and a runtime associated with a software application and generating refactored code of the software application thereby operationally modifying the software application. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with analyzing source code and a runtime associated with a software application and generating refactored code of the software application thereby operationally modifying the software application. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with analyzing source code and a runtime associated with a software application and generating refactored code of the software application thereby operationally modifying the software application. In another embodiment, the invention provides a business method that performs the process steps of the invention on a subscription, advertising, and/or fee basis. That is, a service supplier, such as a Solution Integrator, could offer to enable a process for improving software technology associated with analyzing source code and a runtime associated with a software application and generating refactored code of the software application thereby operationally modifying the software application. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
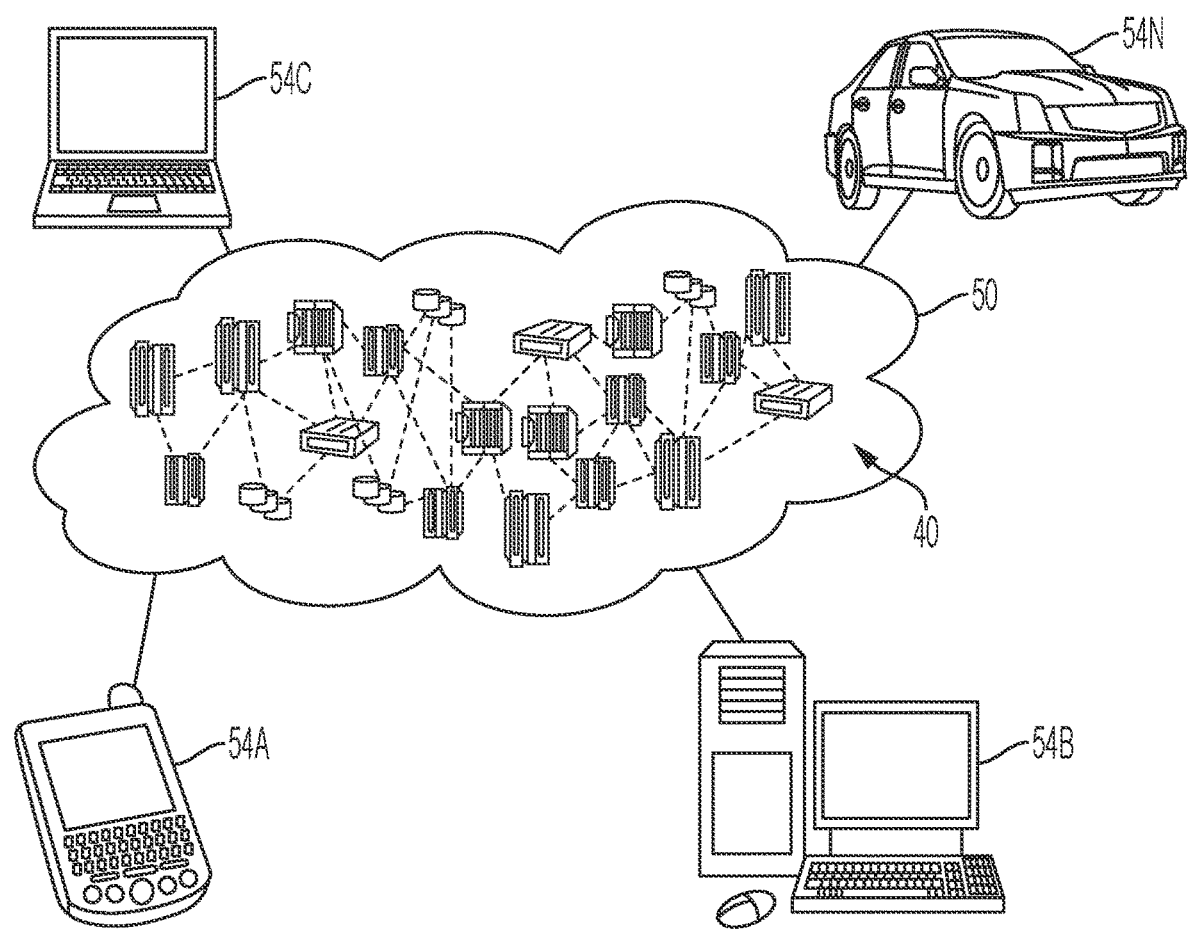
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 7:
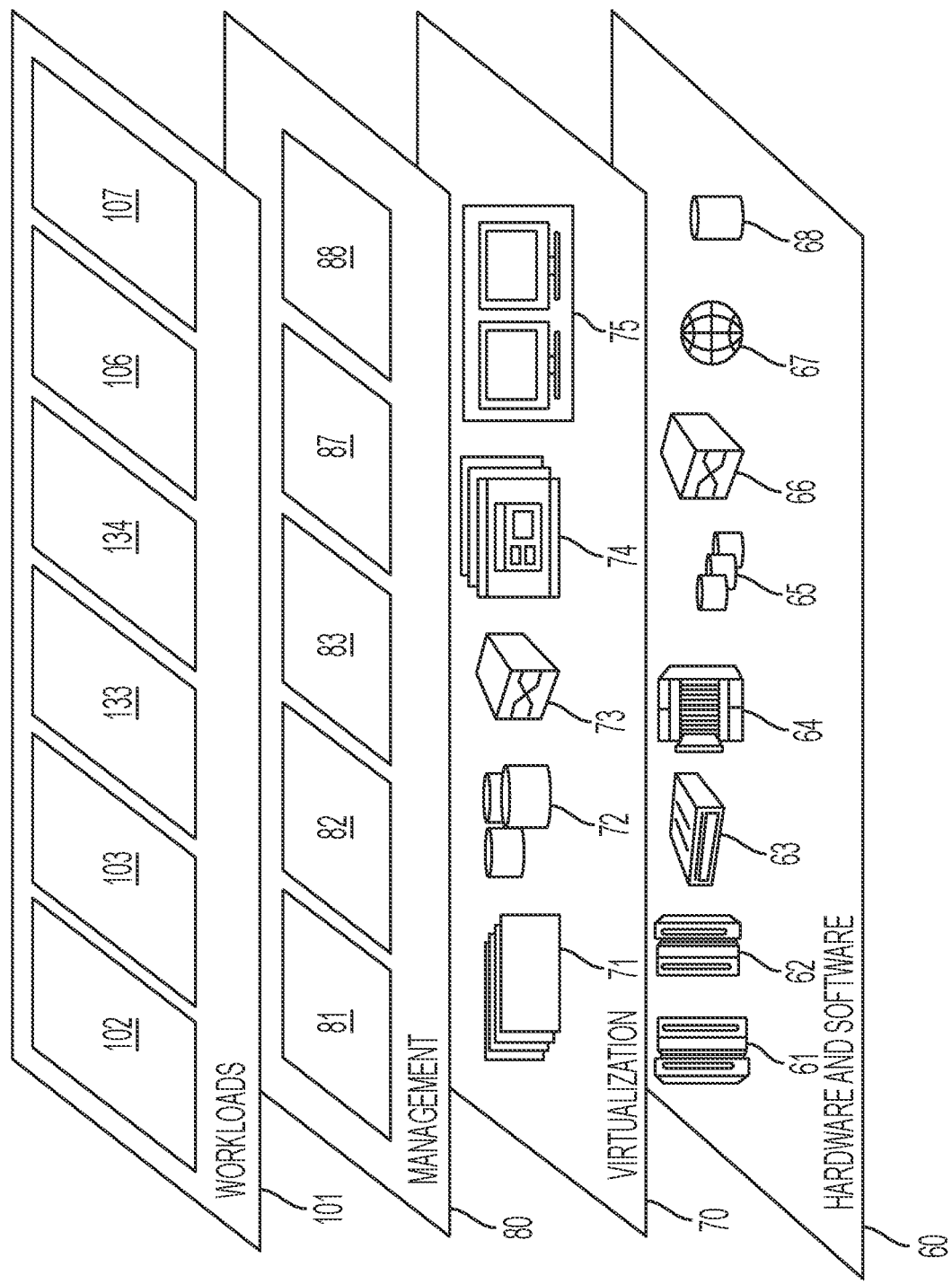
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software technology associated with analyzing source code and a runtime associated with a software application and generating refactored code of the software application thereby operationally modifying the software application 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A server comprising a processor coupled to a computer-readable memory unit, the memory unit comprising instructions that when executed by the processor implements a software modernization and refactoring method comprising:
    analyzing, by said processor, source code of a software application;
    first identifying, by said processor based on results of said analyzing said source code, first components and first associated interconnections of said source code;
    analyzing, by said processor, a runtime associated with said software application;
    second identifying, by said processor based on results of said analyzing said runtime, second components and second associated interconnections of said runtime;
    analyzing, by said processor, architectural data with respect to said source code and said runtime, wherein said architectural data comprises data defining components of said software application;
    generating, by said processor based on results of said analyzing said architectural data, a software and hardware model associated with operation of said server and said software application;
    correlating, by said processor, said software and hardware model with said results of said analyzing said source code and said results of said analyzing said runtime;
    generating, by said processor in response to results of said correlating, refactoring model code associated with a refactoring process configured to generate refactored code;
    generating, by said processor in response to said generating said refactoring model code, a dashboard graphical user interface (GUI) associated with executing multiple possibilities for modifying said software application within a same format and abstraction level as said architectural data;
    executing, by said processor in response to input entered via said dashboard GUI, said refactoring model code; and
    generating, by said processor in response to results of said executing, refactored code of said software application thereby operationally modifying said software application.

2. The server of claim 1, wherein said method further comprises:
    enabling, by said processor, interactions between an architect entity and said dashboard GUI; and
    generating, by said processor in response to said interactions, a final design for said software application, wherein said executing is performed with respect to said final design.

3. The server of claim 2, wherein results of said interactions determine that a gap exists within a proposed design associated with said generating said final design, and wherein said method further comprises:
    receiving, by said processor from said architect via said dashboard GUI, data associated with said gap; and
    generating, by said processor based on said data, a revised design for said software application, wherein said generating said final design is performed with respect to said revised design.

4. The server of claim 2, wherein results of said interactions determine that said architect has authorized at least one option associated with said final design; and wherein said final design is finalized after said at least one option has been authorized.

5. The server of claim 1, wherein said architectural data comprises a visual architectural diagram presenting said components of said software application, and wherein said architectural diagram comprises multiple levels.

6. The server of claim 1, wherein said refactoring process comprises a process selected from the group consisting of a software replatform process, a software rearchitecting process, and a software redesigning process.

7. The server of claim 1, wherein said analyzing said source code comprises executing program analysis code with respect to said source code, and wherein analyzing said runtime comprises executing instrumentation and log analytics code with respect to a runtime behavior of said runtime.

8. The server of claim 1, wherein said analyzing said architectural data comprises correlating information from multiple diagrams comprising said architectural data with respect to said source code and said runtime.

9. The server of claim 1, wherein said method further comprises:
executing, by said processor, said refactored code;
generating, by said processor in response to results of said executing said refactored code, updated architectural data, updated source code, and an updated deployment design for said software application; and
implementing, by said processor, said updated architectural data, aid updated source code, and said updated deployment design with respect to said software application being operationally modified.

10. A software modernization and refactoring method comprising:
analyzing, by a processor of a server, source code of a software application;
first identifying, by said processor based on results of said analyzing said source code, first components and first associated interconnections of said source code;
analyzing, by said processor, a runtime associated with said software application;
second identifying, by said processor based on results of said analyzing said runtime, second components and second associated interconnections of said runtime;
analyzing, by said processor, architectural data with respect to said source code and said runtime, wherein said architectural data comprises data defining components of said software application;
generating, by said processor based on results of said analyzing said architectural data, a software and hardware model associated with operation of said server and said software application;
correlating, by said processor, said software and hardware model with said results of said analyzing said source code and said results of said analyzing said runtime;
generating, by said processor in response to results of said correlating, refactoring model code associated with a refactoring process configured to generate refactored code;
generating, by said processor in response to said generating said refactoring model code, a dashboard graphical user interface (GUI) associated with executing multiple possibilities for modifying said software application within a same format and abstraction level as said architectural data;
executing, by said processor in response to input entered via said dashboard GUI, said refactoring model code; and
generating, by said processor in response to results of said executing, refactored code of said software application thereby operationally modifying said software application.

11. The method of claim 10, further comprising:
enabling, by said processor, interactions between an architect entity and said dashboard GUI; and
generating, by said processor in response to said interactions, a final design for said software application, wherein said executing is performed with respect to said final design.

12. The method of claim 11, wherein results of said interactions determine that a gap exists within a proposed design associated with said generating said final design, and wherein said method further comprises:
receiving, by said processor from said architect via said dashboard GUI, data associated with said gap; and
generating, by said processor based on said data, a revised design for said software application, wherein said generating said final design is performed with respect to said revised design.

13. The method of claim 11, wherein results of said interactions determine that said architect has authorized at least one option associated with said final design; and wherein said final design is finalized after said at least one option has been authorized.

14. The method of claim 10, wherein said architectural data comprises a visual architectural diagram presenting said components of said software application, and wherein said architectural diagram comprises multiple levels.

15. The method of claim 10, wherein said refactoring process comprises a process selected from the group consisting of a software replatform process, a software rearchitecting process, and a software redesigning process.

16. The method of claim 10, wherein said analyzing said source code comprises executing program analysis code with respect to said source code, and wherein analyzing said runtime comprises executing instrumentation and log analytics code with respect to a runtime behavior of said runtime.

17. The method of claim 10, wherein said analyzing said architectural data comprises correlating information from multiple diagrams comprising said architectural data with respect to said source code and said runtime.

18. The method of claim 10, further comprising:
executing, by said processor, said refactored code;
generating, by said processor in response to results of said executing said refactored code, updated architectural data, updated source code, and an updated deployment design for said software application; and
implementing, by said processor, said updated architectural data, aid updated source code, and said updated deployment design with respect to said software application being operationally modified.

19. The method of claim 10, further comprising:
providing at least one support service for at least one of creating, integrating, hosting, maintaining, and deploying computer-readable code in the server, said code being executed by the processor to implement: said analyzing said source code, said first identifying, said analyzing said runtime, said second identifying, said analyzing said architectural data, said generating said software and hardware model, said correlating, said generating said refactoring model code, said generating said dashboard GUI, said executing, and said generating said refactored code.

20. A computer program product, comprising a computer readable hardware storage device storing a computer readable program code, said computer readable program code comprising an algorithm that when executed by a processor of a server implements a software modernization and refactoring method, said method comprising:

analyzing, by said processor, source code of a software application;

first identifying, by said processor based on results of said analyzing said source code, first components and first associated interconnections of said source code;

analyzing, by said processor, a runtime associated with said software application;

second identifying, by said processor based on results of said analyzing said runtime, second components and second associated interconnections of said runtime;

analyzing, by said processor, architectural data with respect to said source code and said runtime, wherein said architectural data comprises data defining components of said software application;

generating, by said processor based on results of said analyzing said architectural data, a software and hardware model associated with operation of said server and said software application;

correlating, by said processor, said software and hardware model with said results of said analyzing said source code and said results of said analyzing said runtime;

generating, by said processor in response to results of said correlating, refactoring model code associated with a refactoring process configured to generate refactored code;

generating, by said processor in response to said generating said refactoring model code, a dashboard graphical user interface (GUI) associated with executing multiple possibilities for modifying said software application within a same format and abstraction level as said architectural data;

executing, by said processor in response to input entered via said dashboard GUI, said refactoring model code; and generating, by said processor in response to results of said executing, refactored code of said software application thereby operationally modifying said software application.

* * * * *